(12) United States Patent
Finkenzeller

(10) Patent No.: US 9,979,219 B2
(45) Date of Patent: May 22, 2018

(54) CHARGING DEVICE FOR AN ENERGY STORE AND METHOD FOR OPERATING A CHARGING DEVICE

(71) Applicant: SIEMENS AKTIENGESELLSCHAFT, München (DE)

(72) Inventor: Michael Finkenzeller, München (DE)

(73) Assignee: SIEMENS AKTIENGESELLSCHAFT (DE)

( * ) Notice: Subject to any disclaimer, the term of this patent is extended or adjusted under 35 U.S.C. 154(b) by 135 days.

(21) Appl. No.: 14/648,915

(22) PCT Filed: Nov. 27, 2013

(86) PCT No.: PCT/EP2013/074823
§ 371 (c)(1),
(2) Date: Jun. 2, 2015

(87) PCT Pub. No.: WO2014/086629
PCT Pub. Date: Jun. 12, 2014

(65) Prior Publication Data
US 2015/0303715 A1   Oct. 22, 2015

(30) Foreign Application Priority Data

Dec. 6, 2012 (DE) .................. 10 2012 222 427

(51) Int. Cl.
*H02J 7/00* (2006.01)
*B60L 1/00* (2006.01)
(Continued)

(52) U.S. Cl.
CPC .............. *H02J 7/007* (2013.01); *B60L 1/00* (2013.01); *B60L 11/1803* (2013.01);
(Continued)

(58) Field of Classification Search
CPC ..... H02J 7/007; H02J 7/0052; B60L 11/1803; B60L 11/1814; B60L 11/1844
(Continued)

(56) References Cited

U.S. PATENT DOCUMENTS 7,859,201 B2    12/2010  Ishikawa
2009/0315392 A1*  12/2009  Ichikawa ............... B60L 11/18
                                                          307/9.1
2011/0316465 A1   12/2011  Bouchez

FOREIGN PATENT DOCUMENTS

DE   102008063465 A1   6/2010
DE   102010002318 A1   8/2011
(Continued)

OTHER PUBLICATIONS

Machine Translation of JP 2008172857A. Ishida, Takeshi, Charger for Battery in Railroad Vehicle, Jul. 24, 2008.*
(Continued)

*Primary Examiner* — Edward Tso
*Assistant Examiner* — Aaron Piggush
(74) *Attorney, Agent, or Firm* — Schmeiser Olsen & Watts LLP

(57) ABSTRACT

A battery with simultaneous active compensation of the interference signals occurring during the charging is provided. In order to charge the battery, at least two converters are used, which can control connected loads during the working operation. During the charging operation, one converter controls the charging process while the other converter performs an active compensation of the interference signals that occur.

17 Claims, 2 Drawing Sheets

Figure 3:
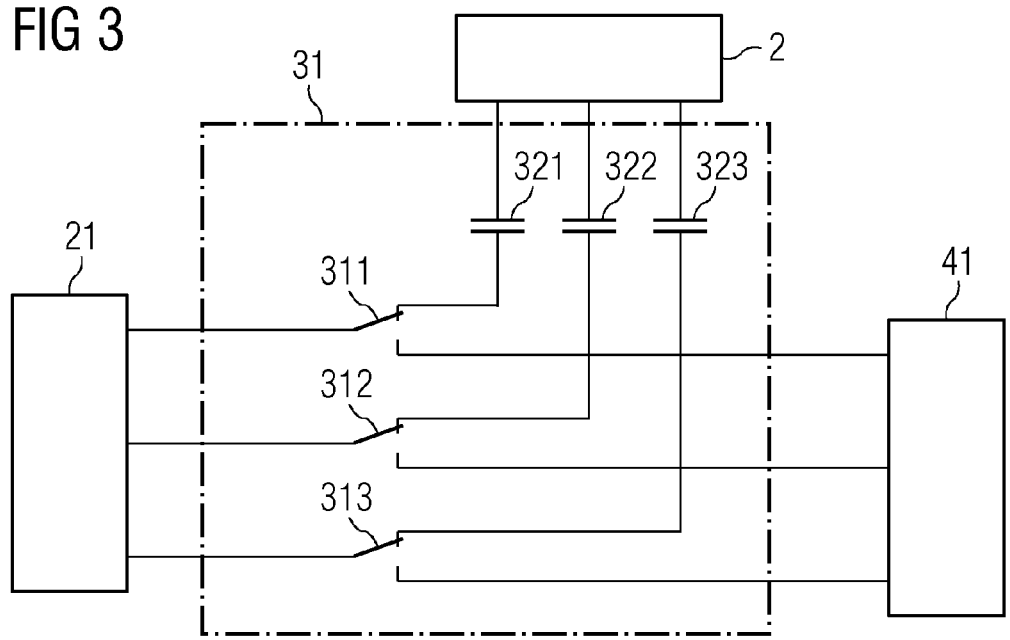

(51) Int. Cl.
*B60L 11/18* (2006.01)
*B60L 15/00* (2006.01)
*H02J 3/01* (2006.01)
*H02M 1/12* (2006.01)
*H02M 1/42* (2007.01)

(52) U.S. Cl.
CPC ....... *B60L 11/1812* (2013.01); *B60L 11/1814* (2013.01); *B60L 11/1816* (2013.01); *B60L 11/1838* (2013.01); *B60L 11/1844* (2013.01); *B60L 15/007* (2013.01); *H02J 3/01* (2013.01); *H02J 7/0052* (2013.01); *H02M 1/12* (2013.01); *B60L 2210/30* (2013.01); *B60L 2210/40* (2013.01); *B60L 2270/147* (2013.01); *H02M 2001/4283* (2013.01); *Y02E 40/40* (2013.01); *Y02E 60/721* (2013.01); *Y02T 10/645* (2013.01); *Y02T 10/7005* (2013.01); *Y02T 10/7072* (2013.01); *Y02T 10/7241* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y04S 10/126* (2013.01)

(58) Field of Classification Search
USPC .................................. 320/104, 109, 138, 162
See application file for complete search history.

(56) References Cited

FOREIGN PATENT DOCUMENTS

JP          2008172857 A    *   7/2008
WO     WO 2006137590 A1      12/2006

OTHER PUBLICATIONS

Cichowlas M. et al: Direct power control for three-phase PWM rectifier with active filtering function; APEC 2003, 18th Annual IEEE Applied Power Electronics Conference and Exposition, IEEE; Bd. 2; pp. 913-918; ISBN: 978-0-7803-7768-4; DOI: 10.1109/APEC.2003.1179325; XP010631621; Feb. 9, 2003.

International Search Report; PCT/EP2013/074823; International Filing Date: Nov. 27, 2013; 3 pgs.

* cited by examiner

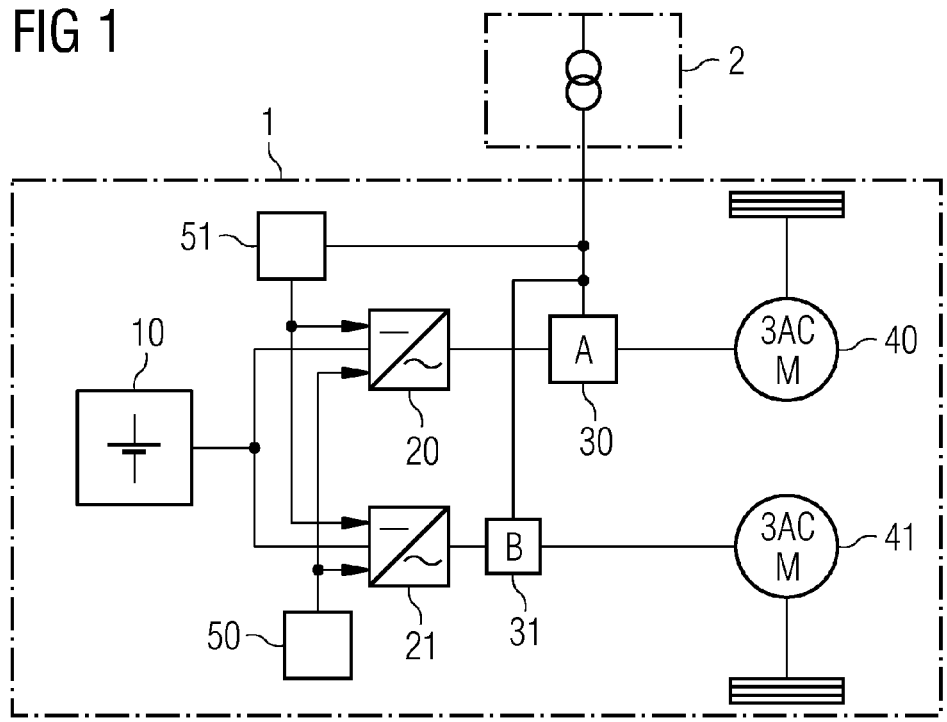
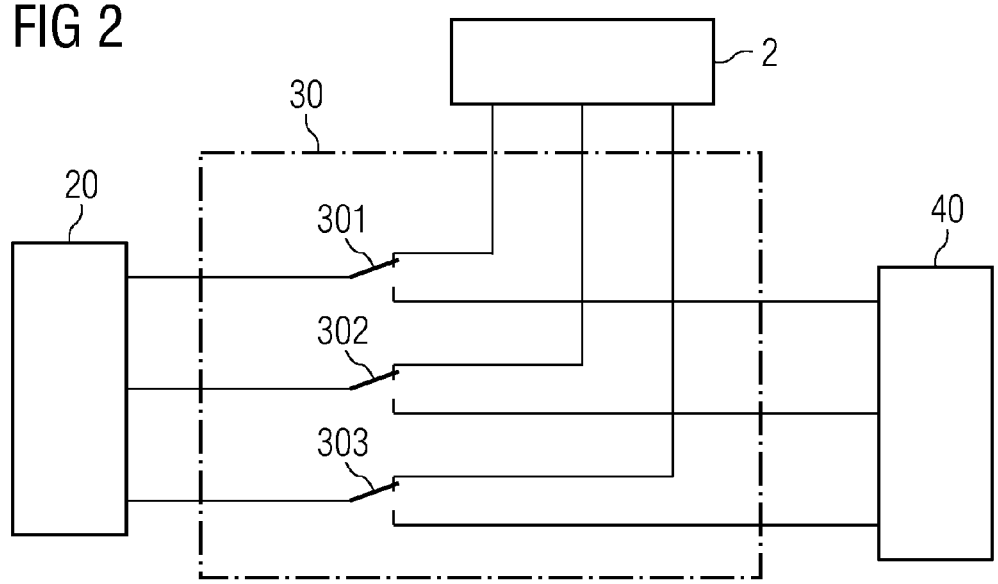

CHARGING DEVICE FOR AN ENERGY STORE AND METHOD FOR OPERATING A CHARGING DEVICE

CROSS-REFERENCE TO RELATED APPLICATIONS

This application claims priority to PCT Application No. PCT/EP2013/074823, having a filing date of Nov. 27, 2013, based on DE 10 2012 222 427.0 having a filing date of Dec. 6, 2012, the entire contents of which are hereby incorporated by reference.

FIELD OF TECHNOLOGY

The following relates to a charging device for an energy store by means of an energy supply system, and also to a method for operating a charging device of this kind.

BACKGROUND

Modern, fully or at least partially, electrically operated motor vehicles have a rechargeable battery and also one or more electric drives. In this case, electrical energy is provided by the battery. This electrical energy is supplied to a converter which converts the battery voltage into a single- or polyphase voltage for the connected electric drive or drives.

In order to recharge the battery, the vehicle has to be connected to an external supply network, for example the local electricity supply system. In this case, the electric vehicle is intended to be connected to the supply network by means of a connection which is as simple and flexible as possible. Furthermore, the battery is intended to be charged with a power which is as high as possible, in order to keep the charging time as low as possible.

DE 10 2008 063 465 A1 describes an electrically operated vehicle in which a converter circuit for driving the electric drives is also used at the same time as a drive circuit for recharging the vehicle battery. To this end, the electric drive is disconnected from the converter circuit and the converter circuit is connected to the supply network in order to recharge the battery.

During recharging of a battery of an electrically operated vehicle, the converter circuit, which supplies the electrical energy from the supply network to the battery, is operated at a high-frequency clock rate in the range of several kilohertz, usually in the range of between 10 and 30 kHz. Interference signals which can be transmitted into the connected supply network are produced in the process. In order to prevent the connected supply network from being adversely affected, reactions of the charging circuit on the supply network must not exceed prespecified limit values. To this end, the charging circuit has to be equipped with a suitable interference suppression device. On account of the high currents which flow during recharging of the motor vehicle battery, the required interference-suppression means is of very complicated configuration.

There is therefore a need for improved compensation of the interference signals which are produced during charging of a battery of a motor vehicle.

SUMMARY

According to a first aspect, the present invention provides a charging device for an energy store having a first energy converter which is connected to the energy store and which is designed to drive a first load; a second energy converter which is connected to the energy store and which is designed to drive a second load; a first supply system connection device which is designed to connect an energy supply system to the first energy converter; a second supply system connection device which is designed to connect the energy supply system to the second energy converter; wherein the first energy converter is further designed to charge the energy store with the energy which is provided by the energy supply system; and wherein the second energy converter is designed to compensate for an adverse effect, which is generated by the first energy converter, in the energy supply system during charging of the energy store.

According to a further aspect, the present invention provides a method for operating a charging device, comprising the steps of providing an energy store; providing a first energy converter which is connected to the energy store; providing a second energy converter which is connected to the energy store; connecting the first energy converter to an energy supply system which provides electrical energy; connecting the second energy converter to the energy supply system; charging the energy store using electrical energy which is provided at the first energy converter; and compensating for an adverse effect in the energy supply system, which occurs during charging of the energy store, using the second energy converter.

According to one idea on which embodiments of the present invention are based, one battery is therefore charged by means of a first transformer, while interference pulses which occur are actively compensated for by means of a further, second transformer. Therefore, the interference signals which occur during the charging process are effectively reduced and the adverse effect on the connected supply network can be minimized in an efficient manner.

In this case, one considerable advantage is that the same energy converters as drive the electric drives during driving of the motor vehicle are used for controlling the charging process and the active compensation of the interference signals. Therefore, only minor modifications to the corresponding energy converters are required in order to upgrade the charging device in line with embodiments of the invention. The charging device according to embodiments of the invention can therefore be realized in a particularly efficient and cost-effective manner.

A further advantage is that the energy which is required for charging the battery has to be controlled exclusively by means of a first energy converter, while the interference signals are actively compensated for by means of a separate energy converter. Therefore, it is necessary to dimension only that energy converter which controls the charging of the battery for the correspondingly high currents, while only very low currents have to be controlled to actively compensate for the interference signals.

Since driving of the charging of the battery, including compensation of the interference signals which occur in the process, is realized by the circuit technology which is already present in the motor vehicle, the charging arrangement can therefore be advantageously connected to a conventional supply network in a particularly simple manner, without further complex circuit arrangements for filtering the interference signals being required in the process.

According to one embodiment, the first supply system connection device provides a connection between the first energy converter and the energy supply system during charging of the energy store, and the second supply system connection device provides a connection between the second energy converter and the energy supply system during charging of the energy store. The charging device can be connected to an energy supply network in a simple, cost-effective and efficient manner by connecting the charging device according to embodiments of the invention by means of the two supply system connection devices.

In a further embodiment, the first supply system connection device interrupts a connection between the first energy converter and the first load during charging of the energy store, and the second supply system connection device interrupts a connection between the second energy converter and the second load during charging of the energy store. Therefore, the connected loads are fully decoupled during the charging process.

According to a further embodiment, the charging device further comprises a measuring device which is designed to monitor a voltage in the energy supply system during charging, wherein the second energy converter compensates for the adverse effect in the energy supply system based on the monitored voltage. By monitoring the supply system voltage during the charging process, preferably in real time, the charging apparatus can immediately identify interference signals which occur in a reliable manner and then actively counteract these interference signals by means of the second energy converter.

According to a further embodiment, the charging device further comprises an estimation device which is designed to calculate an adverse effect in the energy supply system during charging, wherein the second energy converter compensates for the adverse effect in the energy supply system based on the calculated adverse effect. The interference signals which occur can be ascertained in a particularly simple manner by estimating interference signals which may potentially occur.

According to a preferred embodiment, the first energy converter is operated with a predetermined control frequency during charging of the energy store, and the estimation device calculates the adverse effect based on the predetermined control frequency. Since the interference signals which occur depend to a great extent on the used control frequencies of the charging control means during charging, the control frequency is very suitable for theoretically calculating the interference signals.

According to a further embodiment, the second supply system connection device comprises a filter unit. It is, for example, possible to use said filter unit to decouple DC voltage components between the supply network and the charging device. The filter unit preferably comprises a high-pass filter, particularly preferably a capacitive coupling between energy converter and energy supply system.

According to a further aspect, the first load is a first electric drive, and the second load is a second electric drive.

One embodiment of the present invention comprises an electric vehicle having a charging device according to embodiments of the invention. A highly flexible connection to a supply network, as can be provided by embodiments of the present invention, is desirable particularly in the case of electric vehicles.

According to one embodiment, the method according to the invention further comprises a step for ascertaining the adverse effect in the energy supply system which occurs, wherein the step for compensating for the adverse effect in the energy supply system compensates for the adverse effect based on the ascertained adverse effect.

According to a further embodiment of the method according to the invention, the step for ascertaining the adverse effect which occurs monitors a voltage in the energy supply system and ascertains the adverse effect based on the monitored voltage.

According to a further embodiment of the method according to the invention, the step for ascertaining the adverse effect which occurs calculates the adverse effect based on a predetermined control frequency.

Further features and advantages of embodiments of the invention can be found in the following description with reference to the appended drawings.

BRIEF DESCRIPTION

Figure 4:
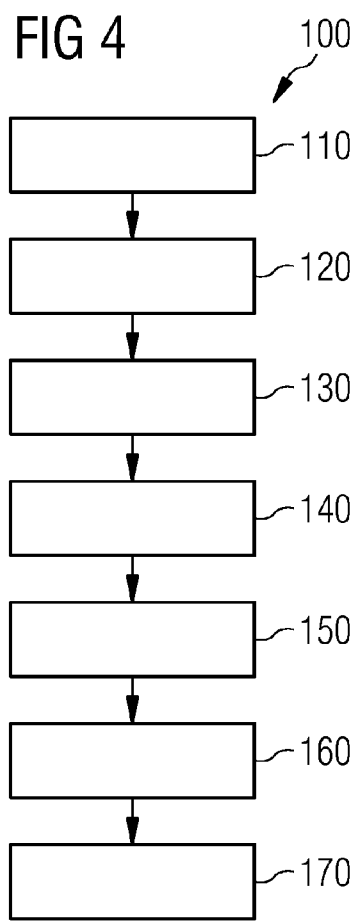

Some of the embodiments will be described in detail, with reference to the following figures, wherein like designations denote like members, wherein:

FIG. 1: depicts a schematic illustration of a charging device according to one embodiment of the present invention;

FIG. 2: depicts a schematic illustration of a first supply system connection device according to one embodiment of the present invention;

FIG. 3: depicts a schematic illustration of a second supply system connection device according to one embodiment of the present invention; and FIG. 4: depicts a schematic illustration of a method for operating a charging device according to one embodiment of the present invention.

DETAILED DESCRIPTION

FIG. 1 is a schematic illustration of an electric vehicle 1 having a charging device according to embodiments of the invention. In this case, the vehicle comprises a battery 10 for storing electrical energy. In this case, any kind of rechargeable electrical energy store is feasible as battery 10. The battery 10 may be, by way of example, a battery based on lithium-ion cells, lithium-polymer cells, nickel-metal hydride cells, rechargeable batteries based on lead, zinc, sodium, lithium, magnesium, sulfur or other metals, elements or alloys. Further energy stores which can output electrical energy and can furthermore also be recharged are likewise possible.

The battery 10 is connected to at least two energy converters 20, 21. Each of these energy converters 20, 21 forms, from the DC voltage which is provided by the battery 10, a single- or polyphase voltage with which the respectively connected electric drives 40, 41 are driven. The energy converters 20, 21 may be, for example, inverters which generate a single- or three-phase AC voltage from the DC battery voltage.

The voltages which are generated by the energy converters 20, 21 are supplied to the electric drives 40, 41. In this case, each wheel of the motor vehicle may, for example, be driven by a separate drive 40, 41. Furthermore, it is also feasible to drive the wheels of the front axle using a first drive, and to drive the wheels of the rear axle using a second drive. Other drive concepts with at least two separately driven drives are likewise possible.

In order to recharge the battery 10, respective supply system connection devices 30, 31 are arranged on the AC voltage sides of the energy converters 20, 21. The vehicle can be connected to a single- or three-phase supply network 2 by means of said two supply system connection devices 30, 31.

FIG. 2 is a schematic illustration of the first supply system connection device 30. In this case, the first supply system connection device 30 serves to connect the supply network for the purpose of recharging the battery 10. In this case, the first supply system connection device 30 has at least one changeover switch 301, 302, 303 for each phase which is to be connected. These changeover switches 301, 302, 303 can be used to connect either the drive 40, or alternatively the supply network 2, to the first energy converter 20. Therefore, it is possible to ensure that the corresponding drive 40 is not supplied with electrical energy from the supply network 2 during the charging process.

FIG. 3 is a schematic illustration of the second supply system connection device 31. The second supply system connection device 31 is arranged in the line run between the second energy converter 21 and the second electric drive 41. Furthermore, the second supply system connection device 31 is likewise connected to the supply network 2. The second supply system connection device 31 comprises the switching elements 311, 312, 313 in order to DC isolate the second drive 41 from the energy supply network during the charging process.

Charging of the battery 10 by the supply network 2 is described in the text which follows. To this end, the switching elements 301 to 313 of the two supply system connection devices 30, 31 are in a switch position which connects the two energy converters 20, 21 to the supply network 2. In this case, the electric drives 40, 41 are disconnected from the energy converters 20, 21 and the supply network 2 by the supply system connection devices 30, 31. Therefore, the electrical energy from the supply network 2 is applied to the first energy converter 20. In this case, the energy converter 20 is operated as a charging controller for the battery 10. In the process, the energy converter 20 rectifies the AC voltage from the supply network 2 and generates a charging voltage for the battery 10. Depending on requirements, the DC voltage which is provided by the energy converter 20 can be matched to the battery voltage by a suitable boost or buck converter within the energy converter 20. The energy converter 20 is clocked at a high-frequency control frequency. This control frequency usually amounts to several kilohertz. The control frequency is preferably in the range of between 10 and 30 kHz.

Clocked operation of the energy converter 20 during the charging process of the battery 10 leads to high-frequency interference signals. Without further countermeasures, these interference signals would propagate in the direction of the supply network 2. This would lead to a considerable adverse effect on the supply network 2 and on the further loads which are connected in said supply network 2.

In order to compensate for the interference signals which are generated by the first energy converter 20 during the charging process, voltage signals which actively compensate for said interference signals are generated by the second energy converter 21. The compensation signals which are generated in this way are supplied to the supply network 2 by the second supply system connection device 31. In this case, the switching elements 311, 312 and 313 are also designed such that the drive 41 is disconnected from the supply network 2 and the second energy converter 21.

Therefore, the interference signals which are generated by the first energy converter 20, and also the compensation signals which are generated by the second energy converter 21, are superimposed on one another and cancel each other out. Therefore, virtually no interference signals enter the supply network 2 given optimum active compensation by the second energy converter 21.

In this case, the battery 10 is recharged exclusively by means of the first energy converter 20, so that only this energy converter 20 has to be designed for correspondingly high charging currents. In this case, the battery 10 can be charged by means of a three-phase connection, as a result of which particularly rapid recharging of the battery 10 is possible. In contrast, only a single-phase supply system connection is available, and therefore the battery can also be recharged only in a single-phase manner. However, the charging time for the battery is increased in this case.

In order to compensate for the interference signals, only relatively low currents have to be provided by the second energy converter 21. Therefore, this energy converter can also be dimensioned to be correspondingly relatively small. Since, furthermore, the interference signals are exclusively high-frequency signals, the DC current components can also be decoupled in the second supply system connection device 31. By way of example, a suitable filter device can be integrated into the second supply system connection device 31. In the simplest case, said filter device may be a capacitor 321, 322, 323. In this case, the dimensioning of these capacitors can be matched to the expected frequency spectrum. In more complex applications, a suitable filter, for example a high-pass filter, may also be integrated as a filter device.

The adverse effects which are produced during the charging process and are to be compensated can be theoretically calculated and/or ascertained by measurement. Firstly, it is possible to estimate and to calculate the adverse effects, which occur during the charging process, based on the known system parameters. For example, the adverse effect which occurs depends to a great extent on the control frequency of the first energy converter 20 during the charging process. Therefore, the known control frequency of the first energy converter 20 can be taken into account for active compensation by the second energy converter 21 during the charging process, and a suitable compensation signal can be generated based on said known control frequency. To this end, an estimation device 50 can, for example, receive information about the frequencies used for charging the battery 10 and, based on said information, calculate the required frequency components which are required for active compensation.

As an alternative or else in addition, the voltage profile at the connection of the energy supply system can be monitored by a measuring device 51. In this case, interference signals which occur can be detected and active compensation by the second energy converter 21 can be adapted based on said detected interference signals. Therefore, variations which are caused on account of different properties of the supply network 2 in particular can also be compensated for in a reliable and efficient manner. The adverse effects on the supply network 2 are limited to a minimum by the charging apparatus according to embodiments of the invention particularly when measurement and active compensation are performed in real time. Therefore, the demands made by the network operator in respect of interference suppression on the supply network 2 can be met.

The charging device according to embodiments of the invention has been described with reference to an electric vehicle above. However, in principle, a charging device of this kind is not restricted to electric vehicles. Instead, it is further likewise possible to charge all kinds of electrical energy stores, in particular all kinds of rechargeable batteries, using an energy supply network and, in the process, to compensate for adverse effects which occur during the charging process. Particularly in the case of operating arrangements in which several loads are connected by means of separate energy converters, such as transformers for example, a transformer can be used in the manner according to embodiments of the invention for charging the energy store, and a further transformer can be used for actively compensating interference signals which occur.

FIG. 4 is a schematic illustration of a flowchart for a method for operating a charging device, as forms the basis for one embodiment of the present invention. In a first step 110, an energy store, for example a rechargeable battery, is provided. In a further step 120, a first energy converter which is connected to the energy store is provided. Furthermore, in a step 130, a second energy converter which is likewise connected to an energy store is provided. The first and the second energy converter can in this case be connected to separate loads in each case during a working mode. The loads can be operated in a controlled manner during this working mode by driving the energy converters in a corresponding manner.

In order to recharge the energy store, the first energy converter is then connected to the energy supply system in a step 140 and therefore electrical energy is provided to the energy converter by the energy supply system. Furthermore, in a step 150, the second energy converter is also connected to the energy supply system. Then, in step 160, the energy store is charged by the energy which is provided at the first energy converter. In step 170, the adverse effects on the energy supply system, which are produced during the charging process, are further compensated for by the second energy converter. To this end, the second energy converter is actively driven in order to thereby generate voltage signals which counteract the adverse effects which are produced by the first energy converter and, in the best case, eliminate said adverse effects.

For active compensation of the adverse effects which occur which is as precise and efficient as possible, the method according to embodiments of the invention can further comprise a step which ascertains the adverse effects and then controls the active compensation based on these ascertained adverse effects. For this purpose, the voltage profile at the connection of the energy supply system can, for example, be monitored and the active compensation can be controlled based on the measurement values ascertained in this way. The voltage monitoring process and analysis of the interference which occurs can preferably be performed in real time.

Furthermore, it is also possible to ascertain the adverse effects which occur by calculation during the charging process. To this end, the expected interference signals can be estimated, for example. The system can be modeled based on the knowledge of clock rate, control frequency and further parameters which form the basis for the charging process of the energy store 10. After a suitable mathematical model has been set up, the expected interference signals are calculated and compensation at the supply system connection is controlled such that the expected adverse effects are minimized.

In summary, embodiments of the present invention relates to charging a battery while at the same time actively compensating for the interference signals which occur during charging. In this case, at least two transformers are used for charging the battery, it being possible for said transformers to control connected loads during a working mode. In the charging mode, one transformer controls the charging process, while the further transformer actively compensates for the interference signals which occur.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A charging device for an energy store comprising:
    a first energy converter which is connected to the energy store and which is configured to drive a first load;
    a second energy converter which is connected to the energy store and which is configured to drive a second load;
    a first supply system connection device which is configured to connect an energy supply system to the first energy converter; and
    a second supply system connection device which is configured to connect the energy supply system to the second energy converter;
    wherein the first energy converter is configured to charge the energy store with energy that is provided by the energy supply system;
    wherein the second energy converter is configured to compensate for an adverse effect in the energy supply system, wherein the adverse effect is generated by the first energy converter during charging of the energy store.

2. The charging device as claimed in claim 1, wherein the first supply system connection device provides a connection between the first energy converter and the energy supply system during charging of the energy store, and wherein the second supply system connection device provides a connection between the second energy converter and the energy supply system during charging of the energy store.

3. The charging device as claimed in claim 1, wherein the first supply system connection device interrupts a connection between the first energy converter and the first load during charging of the energy store, and wherein the second supply system connection device interrupts a connection between the second energy converter and the second load during charging of the energy store.

4. The charging device as claimed in claim 1, further comprising a measuring device which is designed to monitor a voltage in the energy supply system during charging, wherein the second energy converter compensates for the adverse effect in the energy supply system based on the monitored voltage.

5. The charging device as claimed in claim 1, further comprising an estimation device which is designed to calculate an adverse effect in the energy supply system during charging, further wherein the second energy converter compensates for the adverse effect in the energy supply system based on the calculated adverse effect.

6. The charging device as claimed in claim 5, wherein the first energy converter is operated with a predetermined control frequency during charging of the energy store, and wherein the estimation device calculates the adverse effect based on the predetermined control frequency.

7. The charging device as claimed in claim 1, wherein the second supply system connection device comprises a filter unit.

8. The charging device as claimed in claim 7, wherein the filter unit comprises a high-pass filter.

9. The charging device as claimed in claim 1, wherein the first load is a first electric drive, and the second load is a second electric drive.

10. An electric vehicle comprising a charging device as claimed in claim 1.

11. The charging device as claimed in claim 1, wherein the adverse effect is an interference signal propagated in the direction of the energy supply system.

12. The charging device as claimed in claim 11, wherein the interference signal is a high-frequency interference signal.

13. The charging device as claimed in claim 11, wherein the second energy converter propagates compensation signals to cancel out the interference signal.

14. A method for operating a charging device, comprising the steps of:
- providing an energy store;
- providing a first energy converter which is connected to the energy store;
- providing a second energy converter which is connected to the energy store;
- connecting the first energy converter to an energy supply system which provides electrical energy;
- connecting the second energy converter to the energy supply system;
- charging the energy store using electrical energy which is provided at the first energy converter, wherein the step of charging the energy store using electrical energy provided at the first energy converter results in an adverse effect generated on the energy supply system by the first energy converter; and
- compensating for the adverse effect on the energy supply system using the second energy converter.

15. The method as claimed in claim 14, further comprising a step for ascertaining the adverse effect in the energy supply system which occurs, wherein the step for compensating for the adverse effect in the energy supply system compensates for the adverse effect based on the ascertained adverse effect.

16. The method as claimed in claim 15, wherein the step for ascertaining the adverse effect that occurs includes monitoring a voltage in the energy supply system and ascertaining the adverse effect based on the monitored voltage.

17. The method as claimed in claim 16, wherein the step for ascertaining the adverse effect that occurs includes calculating the adverse effect based on a predetermined control frequency.

* * * * *